United States Patent [19]
Filho

[11] Patent Number: 4,778,252
[45] Date of Patent: Oct. 18, 1988

[54] SELF-CENTERING HOLDER FOR OBJECTS OF VARIOUS SIZES

[75] Inventor: Waldemiro M. Filho, Laguna Hills, Calif.

[73] Assignee: Newport Corporation, Fountain Valley, Calif.

[21] Appl. No.: 19,750

[22] Filed: Feb. 27, 1987

[51] Int. Cl.[4] .......................... G02B 7/00; G02B 7/14; B23B 31/16
[52] U.S. Cl. .................................. 350/252; 279/1 L; 279/71; 350/257
[58] Field of Search .............. 350/252, 257, 318, 631; 279/1 L, 35–36, 38, 71–73; 285/322; 269/287; 51/216 LP, 217 L

[56] References Cited

U.S. PATENT DOCUMENTS

| 1,477,440 | 12/1923 | Grier, Jr. | 279/71 |
| 2,032,866 | 3/1936 | Black | 350/257 |
| 2,444,457 | 7/1948 | Marks et al. | 279/35 |

FOREIGN PATENT DOCUMENTS

| 125971 | 9/1980 | Japan | 51/217 L |
| 621875 | 4/1949 | United Kingdom | 350/252 |

*Primary Examiner*—William H. Punter
*Attorney, Agent, or Firm*—Benoit Law Corporation

[57] ABSTRACT

Objects of various sizes are centered and releasably held with a holder member having an annulus and radially mobile object supports or flexible fingers projecting inwardly from that annulus for centering and releasably holding any of the objects inside that annulus. These radially mobile object supports or flexible fingers are of one piece with the annulus. Adjustable actuator members, which may project from an annular structure concentric with, and rotatable to, the annulus, engage the radially mobile object supports or flexible fingers for selectively moving the same radially relative to the annulus for an accommodation of any of the objects. Detents may be provided between the annular structure and the annulus for releasably retaining the annular structure in any of several annular positions relative to the annulus.

30 Claims, 2 Drawing Sheets

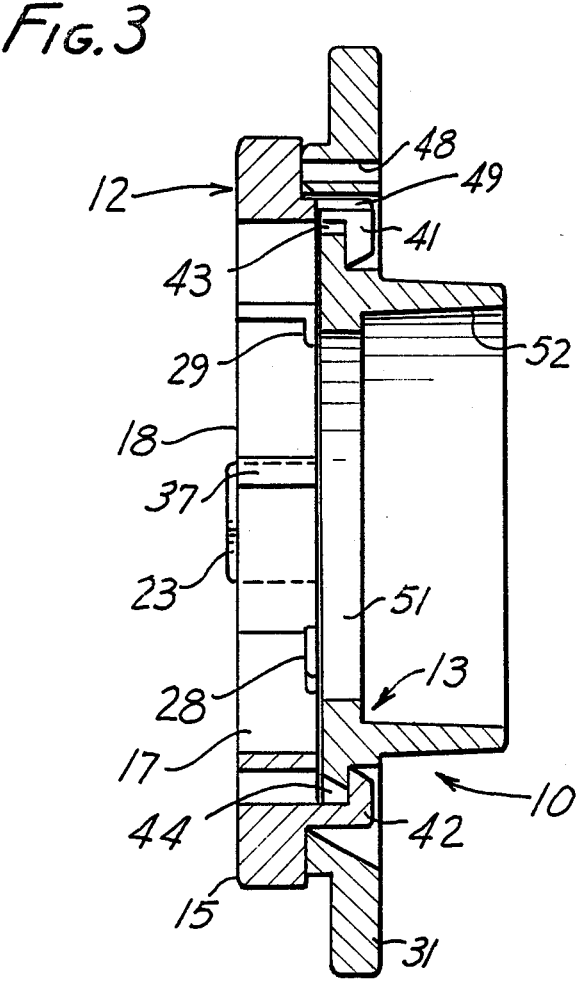

SELF-CENTERING HOLDER FOR OBJECTS OF VARIOUS SIZES

BACKGROUND OF THE INVENTION

Field of the Invention

The subject invention relates to apparatus and systems for centering and releasably holding predetermined objects of various sizes and, by way of example, relates to holders for optical lenses.

Information Disclosure Statement

Apparatus for releasably holding objects include various clamps and vises, in addition to pliers and other hand tools.

Known apparatus for centering and releasably holding optical lenses and other round objects typically include an annulus with typically three radially adjustable object support members projecting into the annulus for holding predetermined objects inside thereof.

Gimbal mounts for mirrors and other larger objects have been equipped with axial retaining clips and radially adjustable, spring-loaded edge-support pads for mounting and centering the objects.

In practice, such equipment requires considerable skill in handling and sometimes time-consuming adjustments. A more automatic system is designed similar to an iris for a photographic camera, having an annulus and an annular structure rotatable relative thereto, and having inwardly projecting lens or object holding fingers pivoted on the annulus and cammed to the annular structure for an accommodation of objects of various sizes. Holders of that type require very high precision in their manufacture and are priced in the upper one hundred to two hundred dollar range.

Because of these shortcomings and complications, many have continued the old practice of using wax, glue, adhesive tape and other makeshift methods for mounting lenses and various other objects in none too satisfactory arrangements.

SUMMARY OF THE INVENTION

It is a general object of this invention to overcome the disadvantages and meet and needs expressed and implicit in the above disclosure statement and in other parts hereof;

It is a germane object of this invention to provide improved apparatus and systems for centering and releasably holding objects of various sizes.

It is a related object of the invention to provide such apparatus of a type that is handy and easy to operate.

It is also an object of this invention to render such apparatus mass producible in large quantities and at a price which is some fifty times less than apparatus of the above mentioned iris type.

Other objects of the invention will become apparent in the further course of this disclosure.

From a first aspect thereof, the subject invention resides in apparatus for centering and releasably holding predetermined objects of various sizes and, more specifically, resides in the improvement comprising in combination a holder member having an annulus and radially mobile object supports distributed inside of and projecting inwardly from that annulus for centering and releasably holding any of the objects inside the annulus, such radially mobile object supports being of one piece with the annulus, and means including adjustable actuator members engaging the radially mobile object supports for selectively moving these object supports radially relative to the annulus for an accommodation of any of the objects.

From a related aspect thereof, the subject invention resides in apparatus for centering and releasably holding predetermined objects of various sizes and, more specifically, resides in the improvement comprising in combination a holder member having an annulus and three flexible fingers distributed equally inside of, and projecting inwardly from, the annulus for centering and releasably holding any of the objects inside that annulus, such flexible fingers being of one piece with the annulus, and means including adjustable actuator members engaging the flexible fingers for selectively moving such fingers relative to the annulus for an accommodation of any of the objects.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 3 is a composite view taken on the lines 3—3 in FIGS. 1 and 2, showing as a result a section through the apparatus composed of the structures of FIGS. 1 and 2 according to the preferred embodiment of the subject invention.

DESCRIPTION OF PREFERRED EMBODIMENT

Figure 1:
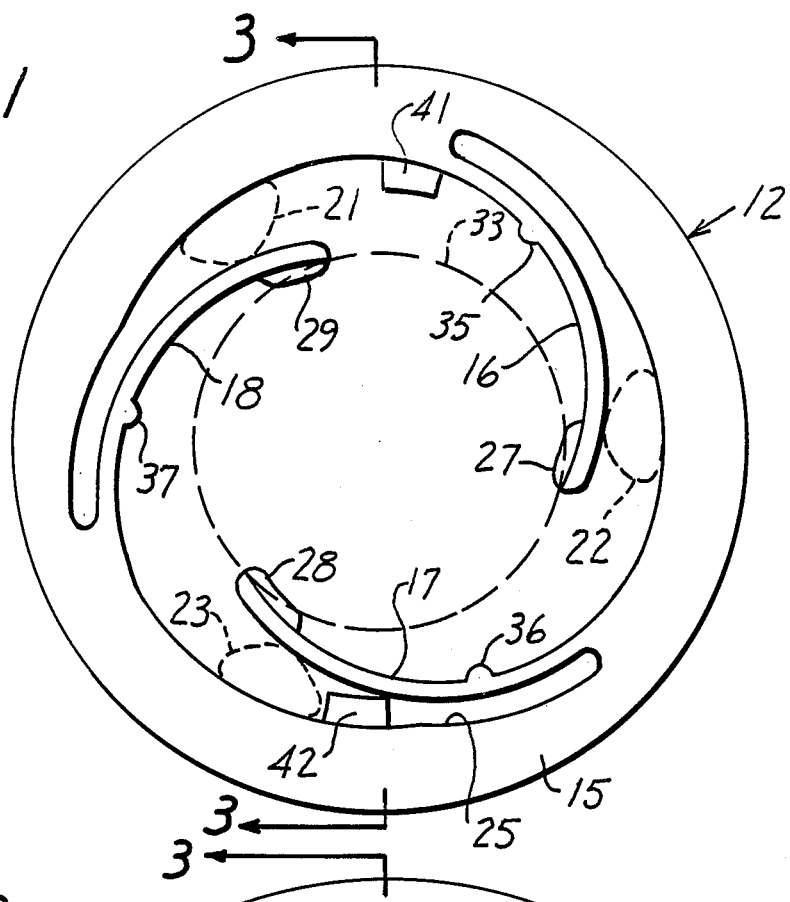
FIG. 1 is an elevation of an annulus and radially mobile object supports for releasably holding predetermined objects of various sizes, according to a preferred embodiment of the subject invention.
Figure 2:
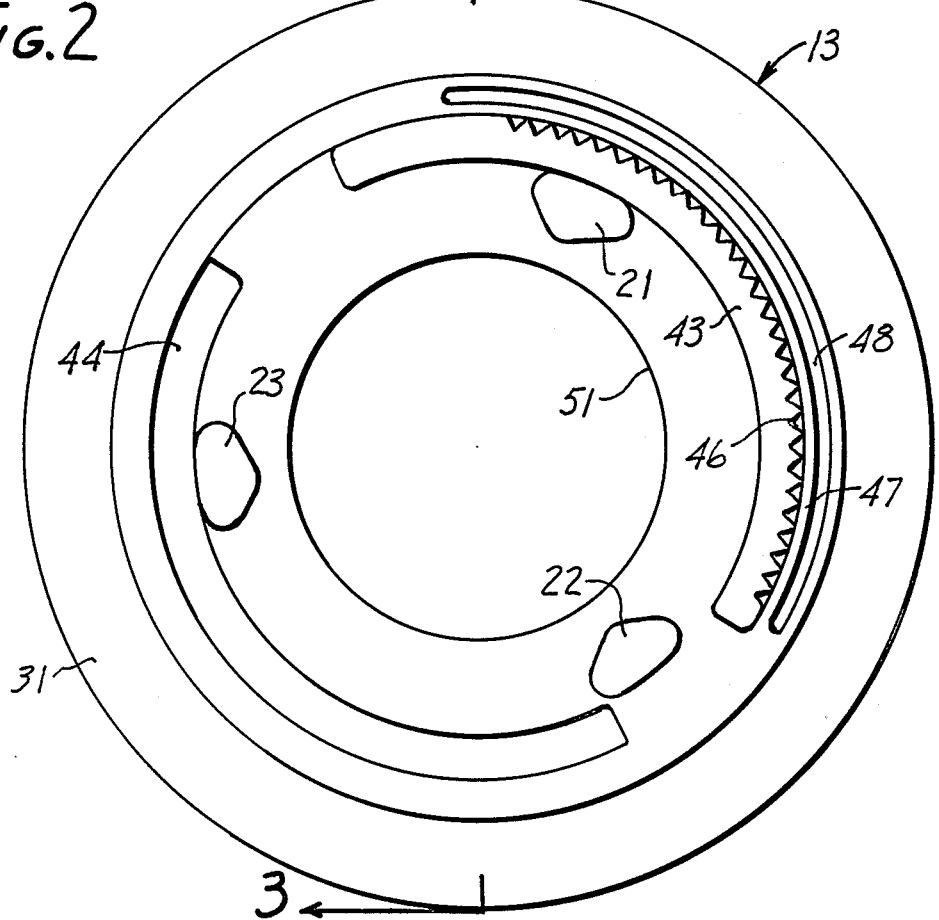
FIG. 2 is an elevation of an annular structure with actuator members for engaging the radially mobile object supports of the structure of FIG. 1, for an accommodation of various objects.

The holder apparatus 10 shown in FIG. 3 is composed of a self-centering holder 12 shown in FIG. 1 and a holding member actuator 13 shown in FIG. 2.

Such apparatus 10 is capable of centering and releasably holding lenses, mirrors and other objects of various sizes upon angular movement of the actuator 13 relative to the holder 12.

The holder 12 has an annulus 15 and three flexible fingers 16, 17 and 18 distributed equally inside of, and projecting inwardly from, that annulus for centering and releasably holding any of the objects inside that annulus. According to the subject invention, the flexible fingers 16 to 18 are of one piece with the annulus 15.

The holding member actuator 13 shown in FIGS. 2 and 3 has projecting actuator members 21, 22 and 23 engaging the flexible fingers of the holder 12 for selectively moving such fingers 16, 17 and 18 relative to the annulus 15 for an accommodation of any of the objects of various sizes for which the particular holder has been designed.

The flexible fingers 16 to 18 emerge gradually from the annulus 15 in progressively divergent relationship to that annulus at an inside 25 thereof. In the illustrated preferred embodiment of the invention, the flexible fingers 16 to 18 extend along spirals from an inside 25 of the annulus 15.

Each of the flexible fingers has a pad or stop at the free end thereof for holding any object against axial displacement. For instance, the flexible fingers 16, 17 and 18 have stops 27, 28 and 29, respectively, at free ends thereof for holding any inserted object against axial displacement. As seen from the illustrated embodiment, each of these stops (see 27 to 29 in FIG. 1, and 28 and 29 in FIG. 3) in that preferred embodiment is a lug projecting radially from an edge of the otherwise free end of the particular finger 16, 17 or 18.

The adjustable actuator members 21, 22 and 23 are solidly illustrated in FIG. 2 as projecting from an annular structure 31 bearing these actuator members and being concentric with, and rotatable relative to, the annulus 15. In the illustrated preferred embodiment, these actuator members 21 to 23 are projecting from, and are of one piece with, the annular structure 31.

As indicated in dotted lines in FIG. 1, the actuator members 21, 22 and 23 engage the flexible fingers 16, 17 and 18 at sides thereof facing the annulus 15 for selective movement of such fingers towards the center of the annulus 15. As seen in the drawings, and particularly in FIG. 1, the actuator members 21, 22 and 23 project axially from the annular structure 31 in between the annulus 15 and the flexible fingers 16, 17 and 18, respectively.

The actuator members 21 to 23 are shown in FIG. 1 in angular positions displaced relative to their angular positions shown in FIG. 2 and also relative to the position of the actuator member 23 shown in FIG. 3. The angular displacement shown in FIG. 1 of the actuator members 21 to 23 is an angular displacement as obtained if the annular structure 31 is rotated counterclockwise relative to the annulus 15, so as to depress the fingers 16 to 18 inwardly onto an inserted object. By way of example, a dotted circle 33 in FIG. 1 symbolizes a lens, mirror, or other round object that is retained by the depressed fingers 16 to 18 at their stops 27 to 29. Of course, objects of much smaller sizes can also be centered and releasably held in the apparatus 10.

Typically, the object to be centered and retained is placed on a stage, which may be a vertical cylindrical support (not shown) which is of lesser diameter than the object to the retained, and onto which the object is placed, to be laterally engaged by the fingers 16 to 18 by rotation of the annular structure 31 relative to the annulus 15. The object 33 or the like may then be lifted off the stage or cylindrical member on which it rested. Stops 27 to 29 at the end of the flexible fingers 16 to 18 prevent the centered and held object from falling off the fingers.

The annular structures 15 and 31 can be rotated clockwise and counterclockwise relative to each other. The user would typically do that by holding the annulus 15 at its periphery with one hand and the annular structure 31 at its periphery with the other hand. The parts 15 and 31 may be provided with knurled peripheries for the purpose. By adjusting the annular structure 31 clockwise relative to the annulus 15, the user effectively can choose the amount of holding force applied to the retained object. The actuator members 21 to 23 may be in the form of cams for that purpose.

By turning the annular structure 31 clockwise relative to the annulus 15, the cams 21 to 23 come to ride onto the outside of the bases of the adjacent fingers, until the cam 21 abuts the inward projection 35 of the finger 16, the cam 22 abuts the inward projection 36 of the finger 17 and the cam 23 abuts the inward projection 37 of the finger 18. In this manner, the fingers 16 to 18 are spread outwardly toward the inside 25 of the annulus 15, and the object 33 is thereby released from the apparatus 10. If that retained object is delicate, it may gently be placed on a stage or platform, typically a small vertical cylindrical object, while it is being so released.

FIG. 1 so far described suggests an alternative within the scope of the subject invention. In this respect, the preferred embodiment, as illustrated is oriented in terms of a design in which the fingers 16 to 18 originally are located in the vicinity of the inside 25 of the annulus 15, and are then depressed inwardly by the cams 21 to 23 against the periphery of a held object 33 or of much smaller releasably retained objects. However, an opposite procedure is also within the scope of the subject invention.

In particular, the holder 12 could be manufactured so that the flexible fingers 16 to 18 initially are closer to the center of the annulus 15 than the radius of any object desired to be held in the apparatus 10. In that case, the annular structure 31 would be rotated clockwise relative to the annulus 15, as seen in FIG. 1, so that the actuator members 21 to 23 or similar cams would come to ride onto the inside of the fingers 16 to 18, whereby such fingers would be radially spread outwardly for an accommodation of any object in the apparatus 10. At that point, the structure 31 would be angularly moved slightly counterclockwise, so that the inserted object is peripherally retained by the inherent flexibility of the fingers 16 to 18.

The embodiment shown in FIGS. 1 to 3 is presently preferred, since it is believed to give the user better control over the amount of holding force applied to the retained object.

The annulus 15 may have hooks or lugs 41 and 42 projecting therefrom through arcuate slots 43 and 44, respectively, in the annular structure 31. As seen in FIG. 3, the lugs 41 and 42 abut portions of the annular structure 31 radially inside of the slots 43 and 44. In practice, the annulus 15 is pushed against the annular structure 31 until the lugs 41 and 42 penetrate the slots 43 and 44 and snap over portions adjacent thereto, as shown in FIG. 3.

The illustrated preferred embodiment provides detent means between the annular structure and the annulus for releasably retaining such annular structure 31 in any of several annular positions relative to the annulus 15. By way of preferred example, the lug 41 may be part of that detent.

In the illustrated preferred embodiment of the invention, a ratchet mechanism is distributed among the annular structure and the annulus 15 for releasably retaining such annular structure 31 in any of several angular positions relative to the annulus. According to FIG. 2, such ratchet mechanism includes a series of ratchet teeth 46 distributed along an arcuate strip 47 which may be realized by providing an arcuate slot 48 radially spaced from the slot 43. The lug 41 may be in the nature of a dog, having a tooth 49 engaging the ratchet teeth 46, as the structure 31 is rotated relative to the annulus 15.

In this manner, the annulus 15 and annular structure 31 may be releasably retained in any one of a great variety of angular positions, for retention of any of a great variety of objects of different diameters in the apparatus 10, at any desired pressure and retention force.

It may be noted in this respect that the dog 41 and ratchet teeth 46 operate as a two-way ratchet system that comes to rest in any desired angular position. This two-way ratchet system has symmetrical teeth 46 as seen in FIG. 2, which provides an outstandingly convenient manner of securely retaining and subsequently releasing variously sized objects.

The annulus 15 with its fingers 16 to 18 is capable of providing a large clearance, and the structure 31 has a correspondingly large aperture 51 for preserving the aperture of mounted lenses or exposing the clear surface of any mounted mirror or other object.

Holders of the subject invention are compatible with a host of standard optical mounts. For instance, the structure 31 may be provided with a tubular projection 52 by means of which the apparatus 10 can be attached to all kind of supports or mounts.

Various methods may be employed for making the structures shown in the drawings. However, in practice the two parts 12 and 13 preferably are made out of plastic by injection molding, and are thereupon snapped together at the lugs 41 and 42 and corresponding openings 43 and 44 with practically none of the usual assembly work being required. All this cooperates in providing the holder 10 at a cost which is at least an order of magnitude lower than the expense of any comparable apparatus. In fact, the manufacturing and assembly costs are so low, that apparatus of the subject invention may be used to hold various lenses, mirrors and other objects in storage, thereby constituting one of the safest and most convenient ways of storing delicate objects and parts.

Nevertheless, the subject invention and its embodiments are, of course, not limited to the illustrated versions. For instance, the flexible fingers 16 to 18 and their function could be performed by other radially mobile object supports, as long as such supports are of one piece with the annulus 15, as required by the subject invention.

Also, the stops 27 to 29 are representative of various means for registration or axial alignment of various objects.

Moreover, more or less than three flexible fingers or radially mobile object supports may be employed, as required in practical situations. For instance, where square objects are to be held, it may be sufficient to provide two diametrically opposite flexible fingers or radially mobile supports for engaging and holding square objects at diagonally opposite corners. V-shaped pads may be provided at the tips of the two flexible fingers for that purpose. If radially mobile object supports other than flexible fingers are employed, it is still important that such supports be made of one piece with the annulus 15 according to the subject invention.

This extensive disclosure will suggest or render apparent to those skilled in the art various modifications and variations within the spirit and scope of the subject invention and of equivalents thereof.

I claim:

1. In apparatus for centering and releasably holding predetermined objects of various sizes, the improvement comprising in combination:
   a holder member having an annulus and radially mobile object supports distributed inside of and projecting inwardly from said annulus for centering and releasably holding any of said objects inside said annulus, said radially mobile object supports being of one piece with said annulus; and
   means including adjustable actuator members engaging said radially mobile object supports for selectively moving said object supports radially relative to said annulus for an accommodation of any of said objects.

2. Apparatus as claimed in claim 1, wherein:
   said radially mobile object supports are flexible fingers distributed inside of and projecting inwardly from, and being of one piece with, said annulus; and
   said adjustable actuator members are positioned for engaging said flexible fingers and for selectively moving said fingers relative to said annulus for an accomodation of any of said objects.

3. Apparatus as claimed in claim 2, wherein:
   said flexible fingers emerge gradually from said annulus in progressively divergent relationship to said annulus at an inside thereof.

4. Apparatus as claimed in claim 2, wherein:
   each of said flexible fingers has a stop at a free end thereof for holding said object against axial displacement.

5. Apparatus as claimed in claim 2, wherein:
   said flexible fingers extend along spirals from an inside of said annulus.

6. Apparatus as claimed in claim 1, wherein:
   said means for selectively moving said object supports include means for releasably retaining said object supports in radial positions provided by said adjustable actuator members.

7. Apparatus as claimed in claim 1, wherein:
   said means for selectively moving said object supports include an annular structure bearing said actuator members and being concentric with, and rotatable relative to, said annulus.

8. Apparatus as claimed in claim 7, wherein:
   said actuator members are projecting from, and of one piece with, said annular structure.

9. Apparatus as claimed in claim 7, including:
   detent means between said annular structure and said annulus for releasably retaining said annular structure in any of several angular positions relative to said annulus.

10. Apparatus as claimed in claim 7, including:
    a ratchet mechanism distributed among said annular structure and said annulus for releasably retaining said annular structure in any of several angular positions relative to said annulus.

11. In apparatus for centering and releasably holding predetermined objects of various sizes, the improvement comprising in combination:
    a holder member having an annulus and three flexible fingers distributed equally inside of, and projecting inwardly from, said annulus for centering and releasably holding any of said objects inside said annulus, said flexible fingers being of one piece with said annulus; and
    means including adjustable actuator members engaging said flexible fingers for selectively moving said fingers relative to said annulus for an accommodation of any of said objects.

12. Apparatus as claimed in claim 11, wherein:
    said flexible fingers emerge gradually from said annulus in progressively divergent relationship to said annulus at an inside thereof.

13. Apparatus as claimed in claim 11, wherein:
    each of said flexible fingers has a stop at a free end thereof for holding said object against axial displacement.

14. Apparatus as claimed in claim 11, wherein:

said flexible fingers extend along spirals from an inside of said annulus.

15. Apparatus as claimed in claim 11, wherein:
said actuator members engage said flexible fingers at sides facing said annulus for selective movement of said fingers toward a center of said annulus.

16. Apparatus as claimed in claim 11, wherein:
said means for selectively moving said fingers include means for releasably retaining said fingers in radial positions provided by said adjustable actuator members.

17. Apparatus as claimed in claim 11, wherein:
said means for slectively moving said fingers include an annular structure bearing said actuator members and being concentric with, and rotatable relative to, said annulus.

18. Apparatus as claimed in claim 17, wherein:
said actuator members are projecting from, and of one piece with, said annular structure.

19. Apparatus as claimed in claim 17, wherein:
detent means between said annular structure and said annulus for releasably retaining said annular structure in any of several angular positions relative to said annulus.

20. Apparatus as claimed in claim 17, including:
a ratchet mechanism distributed among said annular structure and said annulus for releasably retaining said annular structure in any of several angular positions relative to said annulus.

21. In apparatus for centering and releasably holding predetermined objects of various sizes, the improvement comprising in combination:
a holder member having an annulus and three flexible fingers distributed equally inside of, and projecting inwardly from, said annulus for centering and releasably holding any of said objects inside said annulus, said flexible fingers being of one piece with said annulus;
said flexible fingers emerge gradually from said annulus in progressively divergent relationship to said annulus at an inside thereof;
each of said flexible fingers has a stop at a free end threreof for holding said object against axial displacement;
said apparatus includes an annular structure bearing actuator members projecting from, and of one piece with, said annular structure to engage said flexible fingers for selectively moving said fingers relative to said annulus for an accommodation of any of said objects, said annular structure being concentric with, and rotatable relative to, said annulus; and
detent means between said annular structure and said annulus for releasably retaining said annular structure in any of several angular positions relative to said annulus.

22. Apparatus as claimed in claim 21, wherein
said stop at a free end of each finger is a lug projecting radially from an edge of the otherwise free end of the particular finger.

23. Apparatus as claimed in claim 21, wherein:
said actuator members project axially from said annular structure in between said annulus and said flexible fingers, respectively.

24. Apparatus as claimed in claim 21, wherein:
said detent means include a two-way ratchet mechanism distributed among said annular structure and said annulus and having symmetrical teeth for releasably retaining said annular structure in any of several angular positions relative to said annulus.

25. Apparatus as claimed in claim 4, wherein:
said stop at a free end of each finger is a lug projecting radially from an edge of the otherwise free end of the particular finger.

26. Apparatus as claimed in claim 7, wherein:
said actuator members project axially from said annular structure in between said annulus and said flexible fingers, respectively.

27. Apparatus as claimed in claim 9, wherein:
said detent means include a two-way ratchet mechanism distributed among said annular structure and said annulus and having symmetrical teeth for releasably retaining said annular structure in any of several angular positions relative to said annulus.

28. Apparatus as claimed in claim 13, wherein:
said stop at a free end of each finger is a lug projecting radially from an edge of the otherwise free end of the particular finger.

29. Apparatus as claimed in claim 17, wherein:
said actuator members project axially from said annular structure in between said annulus and said flexible fingers, respectively.

30. Apparatus as claimed in claim 19, wherein:
said detent means include a two-way ratchet mechanism distributed among said annular structure and said annulus and having symmetrical teeth for releasably retaining said annular structure in any of several angular positions relative to said annulus.

* * * * *